(12) United States Patent
Westgarth et al.

(10) Patent No.: US 11,686,163 B2
(45) Date of Patent: Jun. 27, 2023

(54) HYDRAULIC FRACTURING CONNECTION ASSEMBLY

(71) Applicant: NATIONAL OILWELL VARCO UK LIMITED, Gloucestershire (GB)

(72) Inventors: Richard Matthew Westgarth, Garden Farm (GB); Graham Knox, Birtley (GB); Jonathan Tweddle, Lanchester (GB)

(73) Assignee: NATIONAL OILWELL VARCO UK LIMITED, Gloucestershire (GB)

( * ) Notice: Subject to any disclaimer, the term of this patent is extended or adjusted under 35 U.S.C. 154(b) by 40 days.

(21) Appl. No.: 17/643,778

(22) Filed: Dec. 10, 2021

(65) Prior Publication Data

US 2022/0186568 A1 Jun. 16, 2022

(30) Foreign Application Priority Data

Dec. 11, 2020 (GB) ..................... 2019602

(51) Int. Cl.
*E21B 17/043* (2006.01)
*F16L 25/06* (2006.01)
*E21B 17/042* (2006.01)
*E21B 43/26* (2006.01)

(52) U.S. Cl.
CPC ............ *E21B 17/042* (2013.01); *E21B 43/26* (2013.01)

(58) Field of Classification Search
CPC .... E21B 17/043; E21B 33/068; F16L 19/005; F16L 19/0321; F16L 15/003; F16L 15/08; F16L 25/06; F16L 23/028
See application file for complete search history.

(56) References Cited

U.S. PATENT DOCUMENTS

| 101,501 | A | * | 4/1870 | Perkes | .................. | F16B 41/007 |
| | | | | | | 292/307 B |
| 4,124,229 | A | * | 11/1978 | Ahlstone | ............. | F16L 37/2445 |
| | | | | | | 285/391 |
| 4,124,230 | A | * | 11/1978 | Ahlstone | .................. | F16L 21/08 |
| | | | | | | 285/356 |
| 9,631,469 | B2 | * | 4/2017 | Guidry | .............. | F16L 27/12751 |

(Continued)

OTHER PUBLICATIONS

"United Kingdom Application Serial No. GB2019602.8, Search Report dated Feb. 3, 1021", 1 pg.

*Primary Examiner* — Kenneth L Thompson
(74) *Attorney, Agent, or Firm* — Schwegman Lundberg & Woessner, P.A.

(57) ABSTRACT

A connection assembly and a method comprises first and second connector portions having a preload mechanism comprising a plurality of bores and threaded fixings circumferentially spaced around the axis, wherein the preload mechanism is arranged to apply an axial load between shoulders on the first and second connector portions when torque is applied to the threaded fixings. An annular sealing member is compressed between the first and second portions, and the axial load applied between the first and second shoulders by the preload mechanism exceeds a peak hydrodynamic load urging the first and second connector portions in a direction along the axis. The axial force applied by the preload mechanism advantageously reduces the fatigue damage experienced by the connection, for example, by cyclic pressure changes within the connector portions typically caused by pumps operating at high pressures.

20 Claims, 5 Drawing Sheets

(56) References Cited

U.S. PATENT DOCUMENTS

| | | | |
|---|---|---|---|
| 9,695,663 B2 * | 7/2017 | Borak, Jr. | E21B 33/068 |
| 11,105,175 B2 * | 8/2021 | Chirko | F16L 27/1274 |
| 11,187,356 B2 * | 11/2021 | Potier | F16L 19/0231 |
| 2017/0167203 A1 | 6/2017 | Bowley et al. | |

\* cited by examiner

HYDRAULIC FRACTURING CONNECTION ASSEMBLY

CROSS-REFERENCE TO RELATED APPLICATIONS

This patent application claims the benefit of priority to GB Patent Application No. 2019602.8, filed on Dec. 11, 2020, which application is incorporated herein by reference in its entirety.

BACKGROUND TO THE INVENTION

The present invention relates to a threaded connection assembly for the connection of pressurised flowlines adapted to flow pressurised fluid to or from an oil or gas well in a hydraulic fracturing operation, and to a method of making up a threaded connection in a hydraulic fracturing flowline.

US2017/0167203 discloses a drill string connection useful for understanding the invention.

SUMMARY

According to the present invention there is provided a connection assembly, the assembly comprising:

first and second connector portions each having a bore for the flow of fluids between the first and second connector portions, and adapted for inter-connection of the bores along an axis, one of the first and second connector portions having a socket with an internal thread and the other of the first and second connector portions having a pin with an external thread adapted to be received within the socket during inter-connection of the first and second connector portions;

a first shoulder on the first connector portion with a first face and a second shoulder on the second connector portion with a second face; and a preload mechanism comprising:
  a plurality of bores circumferentially spaced around the axis and extending through the first face in a direction towards the second face;
  a plurality of threaded fixings passing through the bores towards the second face adapted to engage a thread;
  and wherein the preload mechanism is arranged to apply an axial load between the first and second shoulders when torque is applied to the threaded fixings;
  wherein the assembly comprises at least one annular sealing member in compression between the first and second portions, and having a sealing diameter; and
  wherein the axial load applied between the first and second shoulders by the preload mechanism exceeds a peak hydrodynamic load urging the first and second connector portions in a direction along the axis.

Typically the axial load is applied by the plurality of threaded fixings after the internal and external threads have been made up and tightened, optionally to a hand-tight load.

Optionally the threads on the first and second portions extend parallel to the axis; for example, axially spaced locations on each of the threads are at the same radial distance from the axis. Optionally the connection assembly comprises a seal pocket, having an annular wall parallel to the axis, and the annular sealing member is optionally disposed on the annular wall, optionally in an annular recess on the annular wall. Optionally the annular sealing member is compressed between a first annular wall on the first connector portion, and a second annular wall on the second connector portion; optionally the first and second annular walls are mutually parallel and parallel with the axis. Optionally the first and second annular walls comprise a socket and boss adapted to be received in the socket. Optionally the or each annular wall has a constant diameter along its length.

Optionally the connector portions are end connectors suitable for connection to pipes or hoses, typically flexible hoses, and are adapted for high pressure transmission of fluids across the connection. Optionally the connector portions have end terminations permitting the connection of the connector portions to high pressure pipes hoses for this purpose. Optionally one of the connector portions can be connected to a manifold connection and the other can be connected to a pipe or hose.

Optionally the shoulders have parallel opposing faces. Optionally the bores are parallel to the axis, and thus the threaded fixings optionally extend parallel to the axis. Optionally the first face is perpendicular to the axis. Optionally the second face is perpendicular to the axis. Optionally the shoulders extend radially and are perpendicular to the axis.

Optionally the shoulders are annular, extending around at least a portion of the connector portion circumference. Optionally the shoulders at least partially surround the bore.

The bores in the plurality of bores are optionally evenly spaced around the circumference at equal angular intervals, optionally symmetrical around the axis, and optionally arranged in pairs of bores which are diametrically spaced around the axis. Optionally the axes of the plurality of bores lie on a circle extending around the circumference, and are equally spaced on the circle.

Optionally the sealing member is elastomeric. Optionally more than one sealing member is provided (for example 2 sealing members), and optionally multiple sealing members are axially spaced from one another along the axis. Optionally each sealing member has the same sealing diameter. Optionally the sealing diameter determines the peak hydrodynamic load urging the first and second connector portions apart along the axis. Thus, the required torque applied to the fixings to overcome the peak hydrodynamic loads urging the first and second connector portions apart typically varies with the sealing diameter.

Optionally the preload mechanism comprises an expansion mechanism. Optionally the axial load urges the first and second shoulders apart in an axial direction.

Optionally the thread engaged by the threaded fixings can be on a threaded annular member extending at least partially around the circumference of the connector portion. Optionally the threaded annular member has threaded bores through which the fixings pass. Optionally the threaded annular member can comprise a ring. Optionally reaction force generated by the thread on the fixings engaging with the thread generates the axial force. Optionally the axial force urges the second shoulder away from the first shoulder in a direction parallel to the axis.

Optionally the threaded annular member comprises a flange on the first portion, e.g. which extends radially with respect to the axis. The flange is optionally integrally formed with the first portion. Optionally the first shoulder is provided on the flange.

The flange is optionally fixed to and is axially immovable with respect to the first portion.

Optionally free ends of the fixings extending from the threaded annular member bear on a reaction plate, which can optionally be annular, and can be disposed between the threaded annular member and the second shoulder (e.g. the second face), such that the reaction plate transmits the axial load generated by the preload mechanism to the second shoulder. The reaction plate can optionally be hardened, and can have a smooth surface facing the first shoulder, which can optionally reduce frictional resistance to rotation of the free ends of the threaded fixings when pressed against the reaction plate.

Optionally the number of fixings is sufficient to apply preload above nominal axial loads experienced by the connector assembly in normal practice.

The invention also provides a method of connecting first and second high pressure conduits adapted for use in a hydraulic fracturing operation conducted on an oil or gas well, the first and second conduits having respective first and second connector portions in fluid communication with respective first and second high pressure conduits, the first and second connector portions being adapted for inter-connection along an axis, each of the first and second connector portions having bores for the flow of fluids;

one of the first and second connector portions having a socket with an internal thread and the other of the first and second connector portions having a pin with an external thread adapted to be received within the socket during inter-connection of the first and second connector portions;

the first connector portion having a first shoulder with a first face and the second connector portion having a second shoulder with a second face;

and wherein the first and second connector portions incorporate a preload mechanism comprising:

a plurality of bores circumferentially spaced around the axis and extending through the first face in a direction towards the second face;

a plurality of threaded fixings passing through the bores towards the second face and adapted to engage with a thread; and wherein the assembly comprises at least one annular sealing member in compression between the first and second portions, and having a sealing diameter;

wherein the method comprises:

receiving the pin within the socket and connecting the first and second connector portions by means of the internal and external threads on the socket and pin;

applying torque to the threaded fixings to apply an axial load between the shoulders; and wherein the axial load applied between the first and second shoulders by the preload mechanism exceeds a peak hydrodynamic load urging the first and second connector portions in a direction along the axis.

Optionally the axial load exceeds the pressure ejection force applied between the first and second connector portions at maximum rated operating pressures within the connector portions.

The axial force applied by the preload mechanism advantageously reduces the fatigue damage experienced by the connection, for example, by cyclic pressure changes within the connector portions typically caused by pumps operating at high pressures.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the spirit and scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or ail of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee. In particular, positional references in relation to the well such as "up" and similar terms will be interpreted to refer to a direction toward the point of entry of the borehole into the ground or the seabed, and "down" and similar terms will be interpreted to refer to a direction away from the point of entry, whether the well being referred to is a conventional vertical well or a deviated well.

Figure 1:
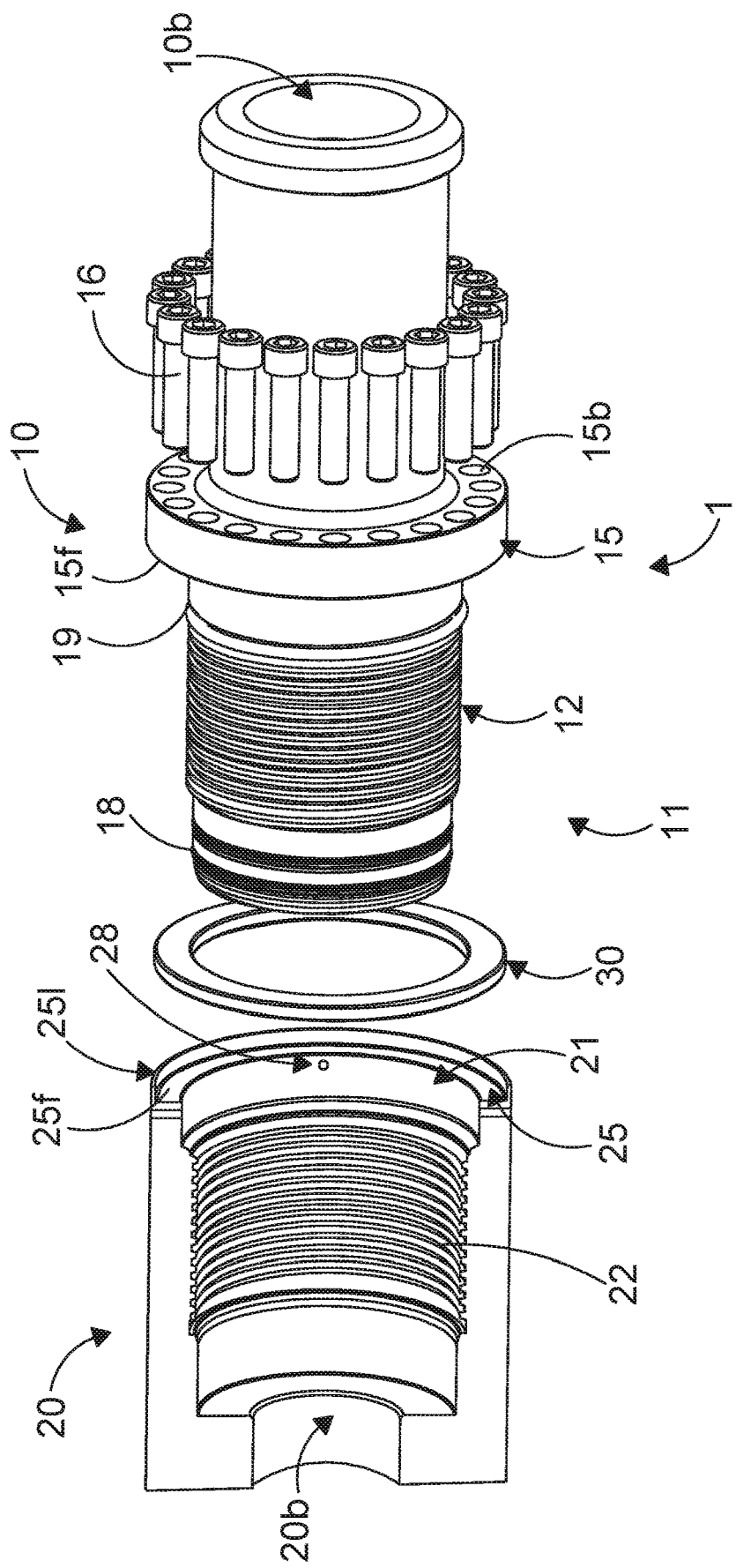
FIG. 1 shows a perspective view of a connection assembly according to one example, with the second connector portion shown in partial cutaway view.
Figure 2:
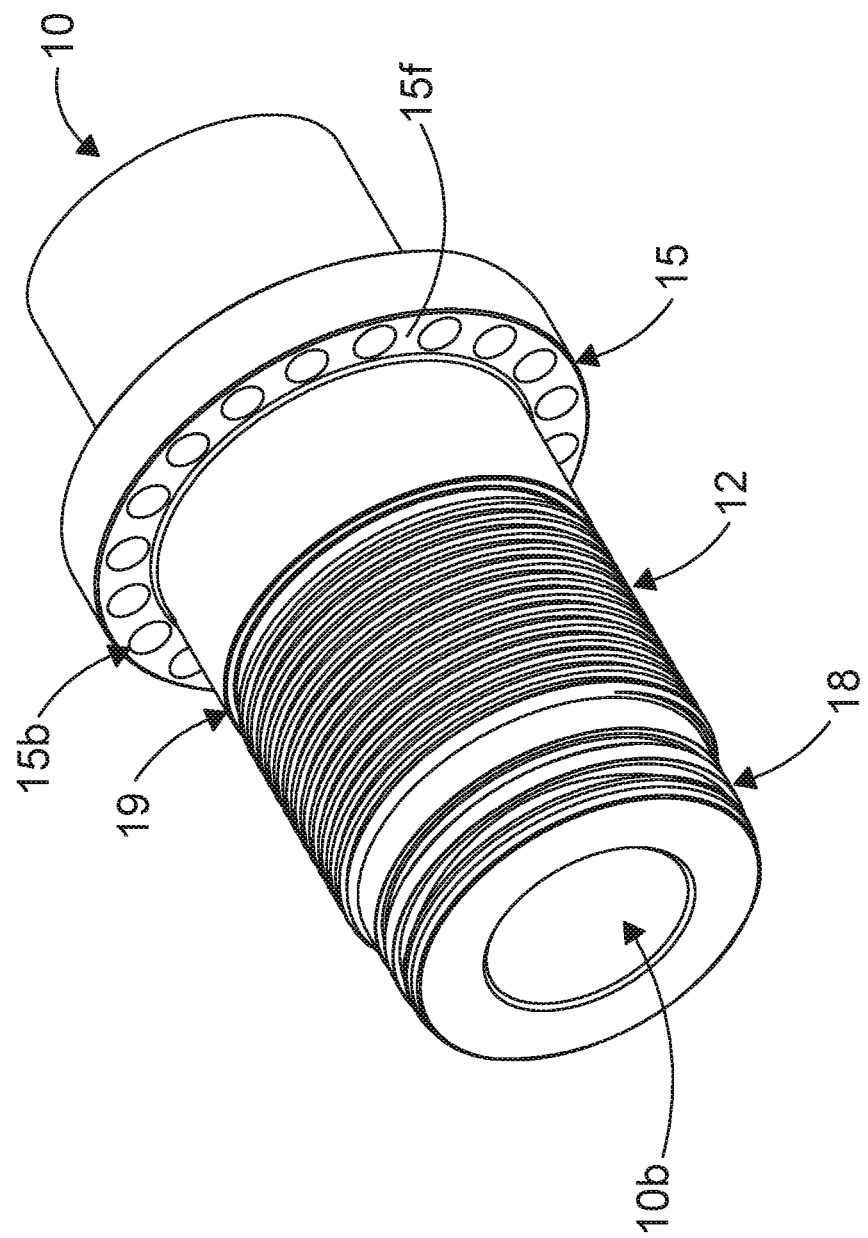
FIG. 2 shows a perspective view of a first connector portion of the FIG. 1 assembly.

Turning now to the drawings, one example of a connector assembly 1 comprises a first connector portion 10 with a generally tubular body having a pin 11 at a distal or free outer end, adapted to fit within a socket 21 at a distal or free outer end of a second connector portion 20, which also has a generally tubular body. The pin 11 has an external thread 12, and the socket 21 has an internal thread 22 adapted to cooperate with the external thread 12 on the pin 11, when the pin 11 is offered to the socket 21. The threads 12, 22 connect the connector portions 10, 20 together when the pin 11 is received within the socket 21. The external thread 12 on the pin 11 stops short of the outer end of the pin 11, which is unthreaded and has annular grooves to receive seals 18 such as o-rings. An inner (proximal) end of the socket 21 is also unthreaded, and the seals 18 are compressed between the unthreaded outer surface of the outer end of the pin 11 and the inner surface of the socket 21 at its inner end when the connector portions 10, 20 are inter-engaged. Optionally, at the inner (proximal) end of the thread 12 on the pin 11, a weather seal 19 of e.g. elastomeric material, such as an O-ring, is provided to exclude fluids from the threads 12, 22 when the connector assembly 1 is made up. The weather seal 19 optionally seals onto a cup on the inner surface of the socket 21. Hence when the connector assembly 1 is made up, the seals 18, 19 typically isolate the inter-engaged threads 12, 22 from both directions.

Each of the connector portions 10, 20 has a bore, 10b, 20b, which extends axially through the centre of each connector portion 10, 20, providing a conduit for the flow of fluids from one end of each connector portion to the other, and which is sealed by the seals 18 when the connector assembly is made up. At outer ends of the connector portions 10, 20, provided with the pin 11 and the socket 21 respectively, the bores 10b, 20b interconnect in alignment along the same axis, permitting fluids to flow from one connector portion 10 to the other 20.

At the opposite inner (proximal) ends of the connector portions, each connector portion 10, 20 has an end termination adapted for connection to pipes or hoses, typically flexible hoses, which are adapted for transmission of high-pressure fluids. In this example, the inner ends to the pin and socket are provided with end termination fittings for frac hoses, typically used for hydraulic fracturing operations within oil and gas wells, and are advantageously connected to such hoses in use. Thus, the connector portions 10, 20 typically serve as end terminations on the flexible hoses used for transmission of high-pressure fluids in hydraulic fracturing equipment.

The first connector 10 has a flange 15 extending perpendicular to the axis of the bore 10b between the inner and outer ends. The flange 15 is optionally integrally formed with the tubular body of the first connector portion. The outer face of the flange 15 is typically arcuate, having a larger radius than the tubular body of the first connector portion 10, and the flange 15 typically forms a first shoulder (perpendicular to the axis of the bore 10b) with a generally flat annular face 15f facing towards the outer end of the pin 11 and the second connector portion 20. The outer diameter of the flange is typically similar to the outer diameter of the tubular body of the second connector portion 20.

The flange 15 has an array of mutually parallel threaded bores 15b extending between the axial face 15f facing the free end of the pin, and the opposite axial face of the flange 15. The axial bores 15b through the flange 15 in this example extend parallel to the axis of the bore 10b. The axial bores 15b are typically arranged in a regular array, circumferentially spaced apart from one another around the flange. The bores 15b are typically arranged in sets, for example, diagonal pairs, spaced part by 180°, but other numbers per set and other spatial relationships are also suitable. Optionally the bores 15b are regularly spaced around the circumference of the flange. The bores 15b have threads on their inner surfaces which engage with threads on the outer surfaces of threaded fixings in the form of jackbolts 16, the free ends of which protrude through the face 15f and extend towards the outer (distal) end of the first connector portion 10, and the heads of which are disposed on the opposite side of the flange 15, facing the inner (proximal) end of the first connector portion 10.

The second connector portion 20 is counterbored at the outer (distal) end of the socket 21 to enlarge the bore 20b at the opening of the socket 21, and to create an annular shoulder 25 with a flat annular face 25f in radial alignment with (and facing towards) the face 15f on the flange 15 of the first connector portion 10 when the connector portions are made up. The shoulder 25 typically has a lip 25l arranged at its radial periphery outside the shoulder 25. Optionally one of the connector portions (e.g. the second connector portion 20) incorporates a pressure vent port 28 to relieve pressure between the first and second connector portions 10, 20, and to reduce the risk of hydraulic locking during decoupling.

Before the first connector portion 10 is inserted into the bore of the second connector portion 20, it is typically offered to the bore of an annular reaction plate 30 which in the connected assembly is disposed between the flange 15 of the first portion and the shoulder 25 of the second portion. The reaction plate 30 can optionally comprise a hardened (and optionally smooth) ring which in use is compressed between the opposing faces 15f and 25f.

Figure 3A:
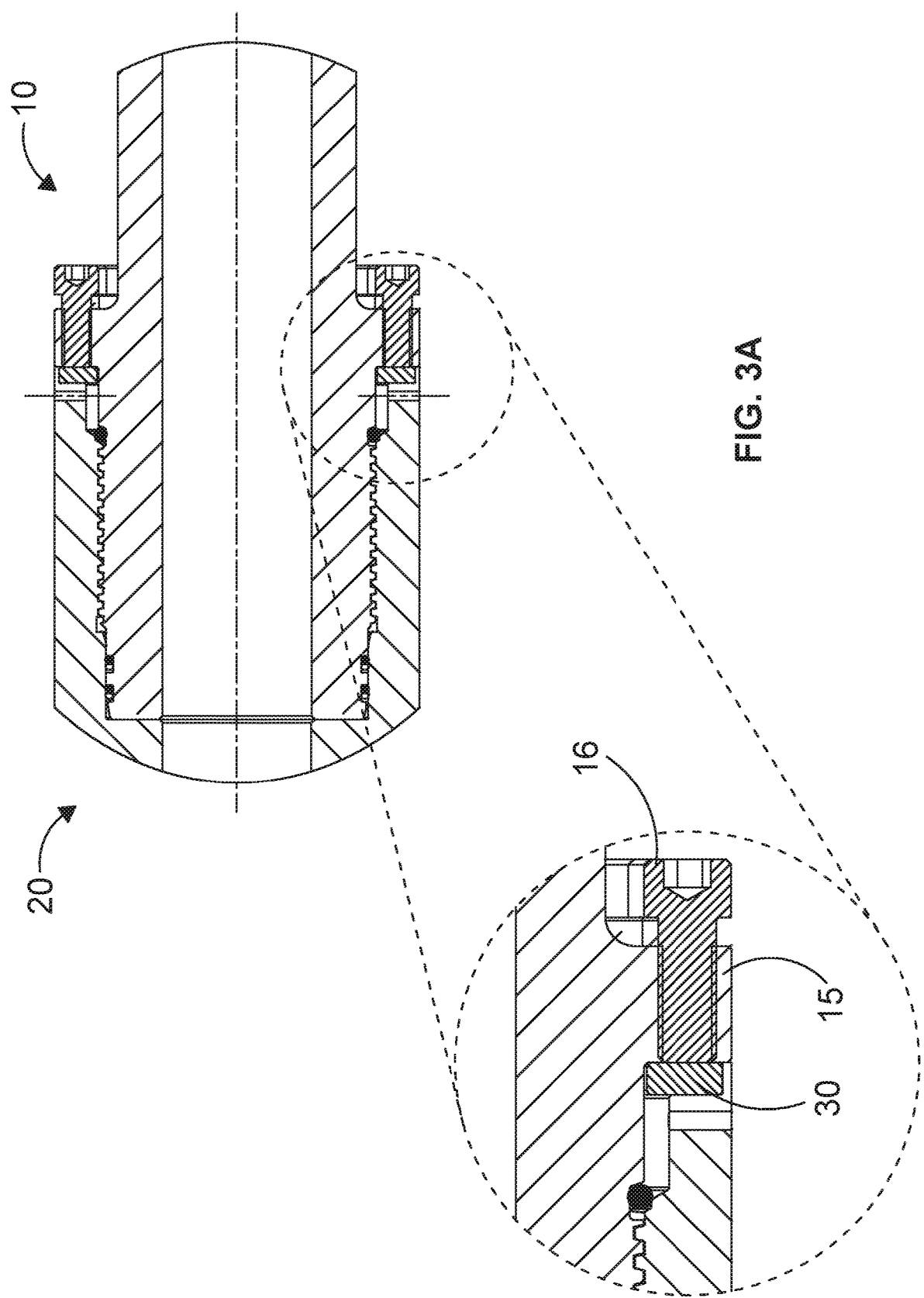
FIG. 3a shows a section view of the connector assembly after make-up of the main threads in the pin and socket and before torque is applied to the plurality of threaded fixings.
Figure 3B:
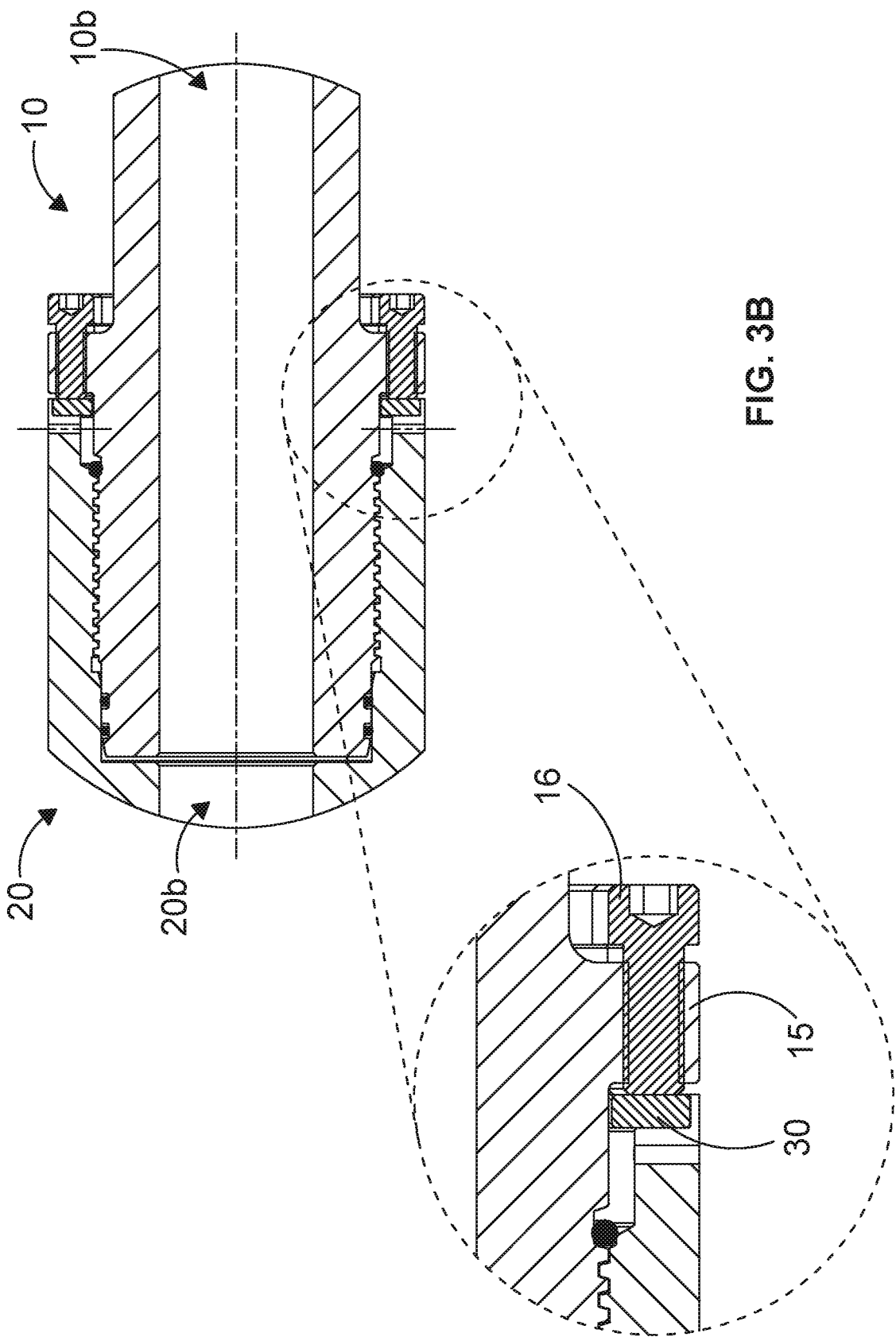
FIG. 3b shows a section view of the made up connector assembly after make-up of the main threads in the pin and socket and after torque is applied to the plurality of threaded fixings.
Figure 4:
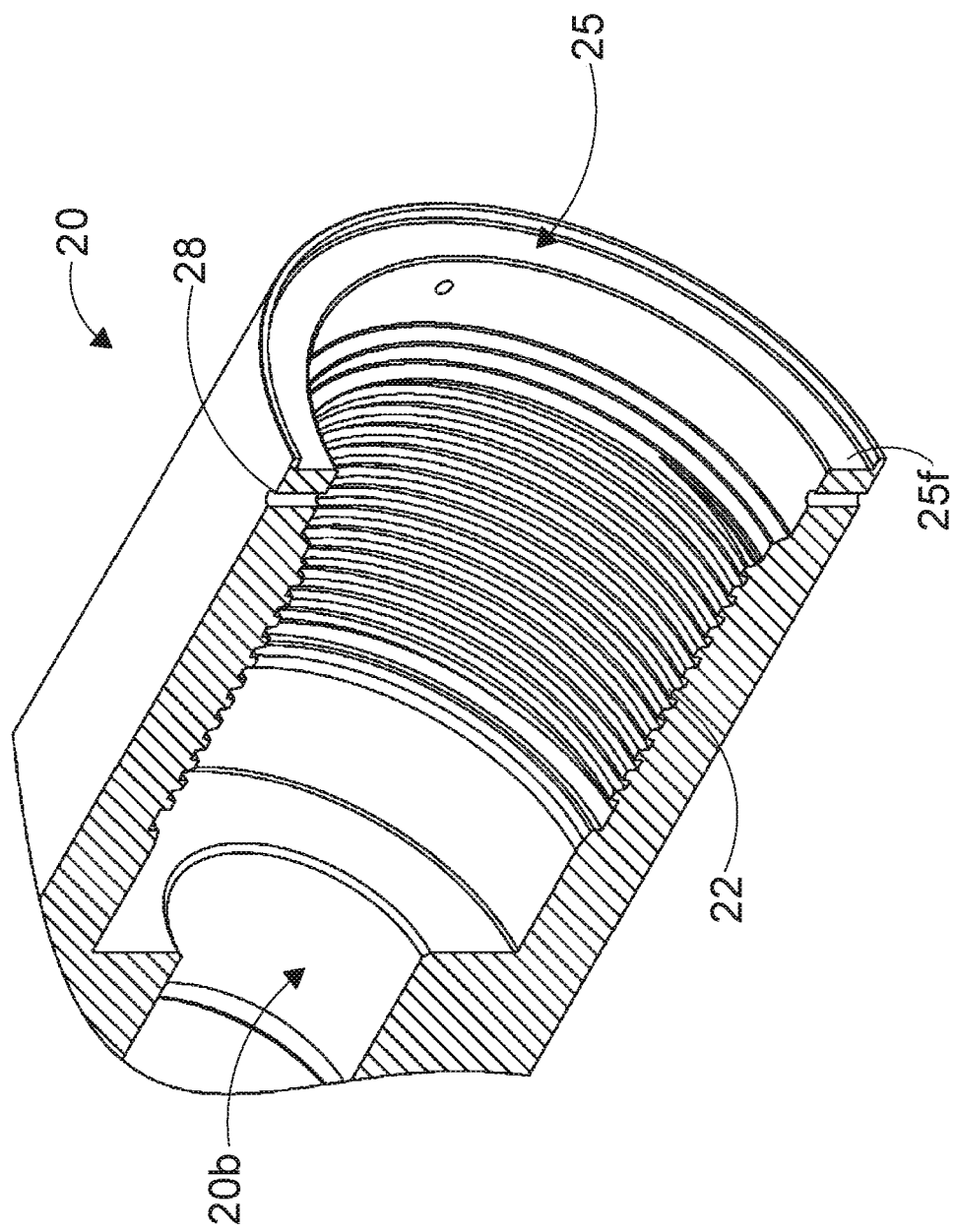
FIG. 4 shows a cutaway view of the second connector portion with a partial section view.

After the reaction plate 30 is disposed on the pin 11 (or placed on the surface 25f) the pin 11 is offered to the socket 21, and the threads 12, 22 inter-engage as the pin is rotated relative to the socket. When the connector portions 10, 20 are made up and the threads 12, 22 are optionally hand tight but before the jackbolts 16 have been tightened in the threaded bores 15b, the assembly is in the configuration shown in FIG. 3a, with the reaction plate 30 lightly compressed between the two connector portions 10, 20. Subsequently, the jackbolts 16 are torqued (e.g. using hand tools and/or torque wrenches) within the threaded bores 15b in the flange 15 of the first connector portion 10 such that the free ends of the jackbolts 16 drive the reaction plate 30 parallel to the axis of the bores 10b, 20b, towards the face 25f on the shoulder 25 of the second portion 20 and away from the face 15f on the flange 15. The connection assembly ultimately reaches the configuration shown in FIG. 3b in which the desired torque is applied to the jackbolts 16, optionally in pairs, to apply a sufficient axial load between the shoulder 25 and the flange 15, which pushes the reaction plate 30 against the second face 25f of the shoulder 25. Sufficient force is applied to the jackbolts 16 to apply a preload between the flange 15 and shoulder 25 which increases the axial load between the connector portions 10, 20 above what is normally experienced by the connector assembly during use, for example during pressure cycling between high and low pressures resulting from the operations of pumps driving fluid through the connection assembly 1. Applying the preload in this manner resists relative movement between the two connector portions 10, 20 during pressure cycling between high and low pressures, and this reduces the fatigue applied to the assembly 1.

Table 1 shows a typical calculation for the desired number of fixings for one example, and the desired characteristics and torque values for that case. The skilled person will appreciate that the particular values represented here are applicable to one example, and that other characteristics, values and dimensions for the fixings can be used for different examples. In the present example, the following steps are taken to calculate those factors for the threaded fixings, with reference to steps 1-5 in table 1 below:
  Calculate separation force+a safety factor (e.g. 10%) added on to ensure load is still being applied when at full pressure as set out in step 1;
  Chose a reasonable bolt size based on available space as set out in step 2;
  Calculate output of that bolt assuming 75% utilisation of bolt yield as set out in step 3;
  Divide force from step 1 by force from step 3 to give number of bolts needed;
  Calculate required input torque for each bolt as shown in step 5.

Using the above method to determine the characteristics and input torque required, the possible example as shown in the drawings used the following characteristics:
  Seal Diameter=4.7"
  Pressure=15,000 psi
  Bolt size=½"
  Bolt Yield=160,000 psi In the event of damage to the connector assembly 1 or the hose to which it is attached, the connector portions 10, 20 can be replaced on the hose as needed using simple techniques, and using the end termination on the opposite (inner) end of the connector portion 10, 22 to the pin 11 or socket 21 as the case may be, enabling repair of expensive items such as the hoses in the event of failure of the connection assembly 1 or the hose. This is particularly useful in hydraulic fracturing applications, because the flexible hoses used in this equipment are subject to pressure fluctuations in phase with the operating speed of the piston is within the pump, which can increase the risk of fatigue-related failure of rigid connections on the end of the flexible hose in particular. By preloading the threaded connection between the connector portions 10, 20 to a load in excess of the ejection force generated by the internal pressure, fatigue life of the connection assembly 1 is increased, yet the connection assembly 1 can be made up using hand tools only as required. In addition to increasing the fatigue life of the connection assembly, the present arrangement reduces the risk of connections loosening or backing off in use.

TABLE 1

| Step 1 | |
|---|---|
| Seal Diameter | $s_d := 4.7$ in |
| Pressure | $P := 15000$ psi |
| Separation Force + 10% | $f_s := \dfrac{s_d^2 \cdot \pi \cdot P \cdot 1.1}{4} \quad f_s = 286266$ lbf |

| Step 2 | |
|---|---|
| Nominal Thread Diameter | $d := 0.5$ in |
| Thread Pitch | $p := \dfrac{1}{13}$ in |
| Coefficient of Friction Between Threads | $f := 0.12$ |
| Coefficient of Friction at Collar | $f_c := 0.12$ |
| Thread Flank Angle | $\alpha := 30$ deg |
| External Minor Diameter | $id := 0.393$ in |
| External Major | $e_m := 0.4985$ in |
| Internal Minor | $i_m := 0.417$ in |
| Bolt Yield | $y := 160000$ psi |
| 75 percent yield | $y_d := y \cdot 0.75 = 120000 \cdot$ psi |

| Step 3 | |
|---|---|
| Bolt force @ 75% Yield | $f_b := \dfrac{y_d \cdot \pi \cdot id^2}{4} \quad f_b = 14556 \cdot$ lbf |

| Step 4 | |
|---|---|
| Bolts Needed (round up) | $n := \dfrac{f_s}{f_b} = 20$ |

| Step 5 | |
|---|---|
| Bolt csa | $a := \dfrac{\pi \cdot id^2}{4} = 0.121 \cdot in^2$ |
| Mean Thread Diameter | $d_m := \dfrac{e_m - i_m}{2} + i_m = 0.458 \cdot$ in |
| Mean Collar Diameter | $d_c := 1.5 \cdot d = 19.05 \cdot$ mm |
| Force needed | $F_i := y_d \cdot a \quad F_i = 14556 \cdot$ lbf |
| Ramp Angle Due to Thread Helix | $\lambda := \mathrm{atan}\left(\dfrac{p}{\pi \cdot d_m}\right) = 3.062 \cdot$ deg |
| Required Torque | $T_r := \dfrac{F_i \cdot d_m}{2} \cdot \left(\dfrac{\tan(\lambda) + f \cdot \sec(\alpha)}{1 - f \cdot \tan(\lambda) \cdot \sec(\alpha)}\right) + \dfrac{F_i \cdot f_c \cdot d_c}{2}$ $T_r = 108 \cdot$ ft $\cdot$ lbf |

The invention claimed is:

1. A hydraulic fracturing connection assembly for the connection of high pressure conduits adapted for use in a hydraulic fracturing operation conducted on an oil or gas well, the assembly comprising:
  first and second connector portions each having a bore for the flow of fluids between the first and second connector portions, and adapted for inter-connection of the bores along an axis, one of the first and second connector portions having a socket with an internal thread and the other of the first and second connector portions having a pin with an external thread adapted to be received within the socket during inter-connection of the first and second connector portions;
a first shoulder on the first connector portion with a first face and a second shoulder on the second connector portion with a second face; and
a preload mechanism comprising:
  a plurality of bores circumferentially spaced around the axis and extending through the first face in a direction towards the second face;
  a plurality of threaded fixings passing through the bores towards the second face adapted to engage a thread;
  and wherein the preload mechanism is arranged to apply an axial load between the first and second shoulders when torque is applied to the threaded fixings;
  wherein the assembly comprises at least one sealing member in compression between the first and second portions, wherein the sealing member is annular and has a sealing diameter; and
  wherein the axial load applied between the first and second shoulders by the preload mechanism exceeds a peak hydrodynamic load urging the first and second connector portions in a direction along the axis.

2. A hydraulic fracturing connection assembly as claimed in claim 1, wherein the bores are parallel to the axis, and wherein the second face is perpendicular to the axis.

3. A hydraulic fracturing connection assembly as claimed in claim 1, wherein the shoulders are annular, extending circumferentially around at least a portion of the first connector.

4. A hydraulic fracturing connection assembly as claimed in claim 1, wherein the bores in the plurality of bores are symmetrically arranged around the axis.

5. A hydraulic fracturing connection assembly as claimed in claim 1, wherein the bores in the plurality of bores are arranged in pairs of bores which are diametrically spaced around the axis.

6. A hydraulic fracturing connection assembly as claimed in claim 1, wherein the preload mechanism comprises an expansion mechanism and wherein the axial load urges the first and second shoulders apart in an axial direction.

7. A hydraulic fracturing connection assembly as claimed in claim 1, wherein the plurality of bores are threaded and pass through a flange extending at least partially around the circumference of the first connector portion.

8. A hydraulic fracturing connection assembly as claimed in claim 1, wherein free ends of the fixings bear on a reaction plate disposed in compression between the first and second shoulders.

9. A hydraulic fracturing connection assembly as claimed in claim 1, wherein the sealing member is elastomeric.

10. A hydraulic fracturing connection assembly as claimed in claim 1, wherein first and second sealing members are provided.

11. A hydraulic fracturing connection assembly as claimed in claim 10, wherein the first and second sealing members are axially spaced from one another along the axis.

12. A hydraulic fracturing connection assembly as claimed in claim 11, wherein each of the first and second sealing member has the same sealing diameter.

13. A hydraulic fracturing connection assembly as claimed in claim 1, wherein the sealing diameter determines the peak hydrodynamic load urging the first and second connector portions apart along the axis.

14. A hydraulic fracturing connection assembly as claimed in claim 1, wherein the threads on the first and second portions extend parallel to the axis.

15. A hydraulic fracturing connection assembly as claimed in claim 1, wherein the sealing member is compressed between a first annular wall on the first connector portion, and a second annular wall on the second connector portion, wherein the first and second annular walls are mutually parallel and parallel with the axis.

16. A method of connecting first and second high pressure conduits adapted for use in a hydraulic fracturing operation conducted on an oil or gas well, the first and second conduits having respective first and second connector portions in fluid communication with respective first and second high pressure conduits, the first and second connector portions being adapted for inter-connection along an axis, each of the first and second connector portions having bores for the flow of fluids;
one of the first and second connector portions having a socket with an internal thread and the other of the first and second connector portions having a pin with an external thread adapted to be received within the socket during inter-connection of the first and second connector portions;
the first connector portion having a first shoulder with a first face and the second connector portion having a second shoulder with a second face;
and wherein the first and second connector portions incorporate a preload mechanism comprising:
  a plurality of bores circumferentially spaced around the axis and extending through the first face in a direction towards the second face;
  a plurality of threaded fixings passing through the bores towards the second face and adapted to engage with a thread;
wherein the assembly comprises at least one sealing member in compression between the first and second portions, wherein the sealing member is annular and has a sealing diameter;
wherein the method comprises:
receiving the pin within the socket and connecting the first and second connector portions by means of the internal and external threads on the socket and pin;
applying torque to the threaded fixings to apply an axial load between the shoulders; and
wherein the axial load applied between the first and second shoulders by the preload mechanism exceeds a peak hydrodynamic load urging the first and second connector portions in a direction along the axis.

17. A method as claimed in claim 16, wherein the axial load exceeds the pressure ejection force applied between the first and second connector portions at maximum rated operating pressures of the high pressure conduits.

18. A method as claimed in claim 16, wherein the threads on the first and second connector portions extend parallel to the axis.

19. A method as claimed in claim 16, including determining the torque applied to the fixings to overcome the peak hydrodynamic load urging the first and second connector portions apart as a function of the sealing diameter.

20. A method of connecting first and second high pressure conduits adapted for use in a hydraulic fracturing operation conducted on an oil or gas well, the first and second conduits having respective first and second connector portions in fluid communication with respective first and second high pressure conduits, the first and second connector portions being adapted for inter-connection along an axis, each of the first and second connector portions having bores for the flow of fluids;
   one of the first and second connector portions having a socket with an internal thread and the other of the first and second connector portions having a pin with an external thread adapted to be received within the socket during inter-connection of the first and second connector portions;
   the first connector portion having a first shoulder with a first face and the second connector portion having a second shoulder with a second face;
   and wherein the first and second connector portions incorporate a preload mechanism comprising:
      a plurality of bores circumferentially spaced around the axis and extending through the first face in a direction towards the second face;
      a plurality of threaded fixings passing through the bores towards the second face and adapted to engage with a thread;
   wherein the assembly comprises at least one annular sealing member in compression between the first and second portions, and having a sealing diameter;
   wherein the method comprises:
      receiving the pin within the socket and connecting the first and second connector portions by means of the internal and external threads on the socket and pin; and
      applying torque to the threaded fixings to apply an axial load between the shoulders; and
   wherein the axial load applied between the first and second shoulders by the preload mechanism exceeds a peak hydrodynamic load urging the first and second connector portions in a direction along the axis;
   wherein the axial load exceeds the pressure ejection force applied between the first and second connector portions at maximum rated operating pressures of the high pressure conduits;
   wherein the annular sealing member is compressed between a first annular wall on the first connector portion, and a second annular wall on the second connector portion, wherein the first and second annular walls are mutually parallel and parallel with the axis;
   and wherein the method includes determining the torque applied to the fixings to overcome the peak hydrodynamic load urging the first and second connector portions apart as a function of the sealing diameter.

* * * * *